United States Patent
Chang

(10) Patent No.: US 6,595,113 B1
(45) Date of Patent: Jul. 22, 2003

(54) RADIATING STRUCTURE FOR A MOTOR OF A FOOD PROCESSOR

(75) Inventor: Wen-Hsien Chang, No. 100, Lane 134, Jungshan Rd., Dashu Shiang, Kaohsiung (TW)

(73) Assignees: Wen-Hsien Chang, Kaosiung (TW); Shih Nung Liu, Taipei (TW)

( * ) Notice: Subject to any disclaimer, the term of this patent is extended or adjusted under 35 U.S.C. 154(b) by 0 days.

(21) Appl. No.: 10/316,927

(22) Filed: Dec. 12, 2002

(51) Int. Cl.⁷ .............................. A23N 1/00; A47J 47/08; A47J 27/00; A47J 27/09
(52) U.S. Cl. ............................... 99/337; 99/348; 99/492; 366/205; 366/206; 366/314; 366/601; 240/37.5; 240/92
(58) Field of Search ........................... 99/326–331, 337, 99/338, 342, 348, 492, 509, 510, 511–513; 241/36, 37.5, 92, 282.1, 282.2, 280; 366/96–98, 100, 197, 205, 206, 314, 601; 200/302.1–302.3; 361/195–203; 219/492, 494, 442, 506, 486; 318/811, 772; 700/90

(56) References Cited

U.S. PATENT DOCUMENTS

| 3,548,280 A | * | 12/1970 | Cockroft ..................... 366/601 |
| 3,809,325 A | * | 5/1974 | Marrie .................... 366/206 X |
| 4,487,509 A | * | 12/1984 | Boyce ......................... 366/199 |
| 4,568,193 A | * | 2/1986 | Contri et al. ................ 366/206 |
| 4,681,030 A | * | 7/1987 | Herbert ........................ 99/484 |
| 4,921,174 A | * | 5/1990 | Okada et al. ........... 366/601 X |
| 4,921,175 A | * | 5/1990 | Okada et al. .............. 241/37.5 |
| 4,941,403 A | * | 7/1990 | Cimenti .................... 99/510 X |
| 5,031,518 A | * | 7/1991 | Bordes .................. 366/314 X |
| 5,184,893 A | * | 2/1993 | Steele et al. ................ 366/209 |
| 5,316,382 A | * | 5/1994 | Penaranda et al. ......... 99/348 X |
| 5,347,205 A | * | 9/1994 | Piland .................... 366/206 X |
| 5,556,198 A | * | 9/1996 | Dickson, Jr. et al. ....... 366/601 |

* cited by examiner

Primary Examiner—Timothy F. Simone
(74) Attorney, Agent, or Firm—Rosenberg, Klein & Lee

(57) ABSTRACT

A radiating structure of a food processor includes an outer shell and an inner shell disposed in the outer shell with a passage formed in between. The inner shell has vent holes on the top, and has a revolving member disposed above it; the revolving member has blades on a bottom, and is turnable together with the shaft of a motor of the food processor. The motor is disposed in the inner shell, and is connected to a fan disposed right above inlets of a base joined to the inner shell. When the motor is working, air is forced to travel into the inner shell via the inlets by the fan to absorb heat produced by the motor, and is forced to travel through the vent holes and the passage to the atmosphere by the blades of the revolving member, thus dissipating the heat.

9 Claims, 5 Drawing Sheets

RADIATING STRUCTURE FOR A MOTOR OF A FOOD PROCESSOR

BACKGROUND OF THE INVENTION

1. Field of the Invention

The present invention relates to a radiating structure for a motor of a food processor, more particularly a radiating structure, which allows heat produced by a motor of a food processor to be dissipated effectively.

2. Brief Description of the Prior Art

Referring to FIG. 1, a conventional food processor 1 includes a lower part 11, a motor 12, and a food container 14. The motor 12 is disposed in the lower part 11 with an upper end of a shaft 121 thereof sticking out from a top of the lower part 11. There are air inlets 17 and air outlets 18 formed on a bottom and lateral sides of the lower part 11 respectively. There is a fan 19 connected to a lower end of the shaft 121 and faced with the air inlets 17 of the lower part 11. There is a revolving member 13 joined to the upper end of the shaft 121.

The food container 14 has cutting blades 15 disposed in a lower portion thereof. Arranged under the bottom of the food container 14 is a connecting block 16; the connecting block 16 is further connected to a shaft (not numbered) joined to the cutting blades 15. When the food container 14 is placed on top of the lower part 11, the connecting block 16 will engage the revolving member 13 so that rotary movement of the shaft 121 can be passed on to the cutting blades 15 in the food container 14. Thus, food held in the food container 14 can be cut into small pieces when the motor 12 is actuated.

The fan 19 is turned together with the shaft 121 to make air flow into the lower part 11 via the air inlets 17 to absorb heat produced by the motor 12 when the motor 12 is working. And, air travels to outside via the air outlet 18 after passing over the motor 12, dissipating heat produced by the motor 12. However, the air outlets 18 are likely to affect the appearance of the food processor badly, and water and juice of food are prone to flow into the lower part 11 to cause damage to the motor. 12 because the air outlets 18 are provided on the lateral sides of the lower part 11. And, air traveling into the lower part 11 can't easily travel to outside, and will move around the inner space of the lower part 11 because there are no fans provided for helping air traveling to outside from the air outlets 18. Consequently, heat produced by the motor can't be efficiently dissipated.

Referring to FIG. 2, another conventional food processor 2 includes a lower part 21, a motor 23, and a food container 22. The motor 23 is disposed in the lower part 21, and has a shaft, which is connected to a fan 27, and a revolving member 24 at a lower end, and an upper end respectively. There are air inlets 28 and air outlets 29 formed on a bottom of the lower part 21; the air outlets 29 are spread out near to the edge of the bottom of the lower part 21, and the air inlets 28 are spread out closer to the center of the bottom to be right below the fan 27.

The food container 22 has cutting blades 26 disposed in a lower portion thereof. A connecting block 25 is connected to a lower end of a shaft (not numbered) joined to the cutting blades 26. The revolving member 24, and the connecting block 25 are formed with engaging surfaces on an upper side and a lower side respectively so that when the food container 22 is placed on top of the lower part 21, rotary movement of the shaft of the motor 13 can be passed on to the cutting blades 26.

When the motor 23 is working, the fan 27 will force air to travel from the atmosphere into the lower part. 21 via the air inlets 18. Thus, heat produced by the motor 23 can be reduced: when air travels from the lower part 21 to the atmosphere. However, the efficiency of heat dissipation of the food processor is not good enough because hot air just traveling out from the air outlets 29 can be forced to travel into the lower part 21 again through the inlets 28, and because a portion of air just traveling through the inlets 28 can easily travel to outside via the outlet 29 without passing over the motor 27 to absorb the heat. Furthermore, in light of the fact that hot air moves upwards, the position of the air outlets 29 is not ideal

SUMMARY OF THE INVENTION

It is a main object of the present invention to provide a food processor, of which the parts are structured so that heat produced by the motor thereof can be dissipated relatively efficiently.

It is another object of the present invention to provide a food processor, which is constructed in such a manner that water or food juice can't easily flow into the housing part to cause damage to the motor thereof.

The food processor includes an outer shell and an inner shell, which is arranged in the outer shell with a passage formed in between. The inner shell has vent holes on the top, and has a revolving member disposed above it; the revolving member can turn together with the shaft of a motor to force air to travel through the passage. The motor is disposed in the inner shell, and is connected to a fan disposed right above air inlets of a base. When the motor is working, air is forced to travel over the motor and through the vent holes and the passage to outside, thus dissipating heat produced by the motor.

BRIEF DESCRIPTION OF THE DRAWINGS

The present invention will be better understood by reference to the accompanying drawing, wherein.

DETAILED DESCRIPTION OF THE PREFERRED EMBODIMENTS

Figure 1:
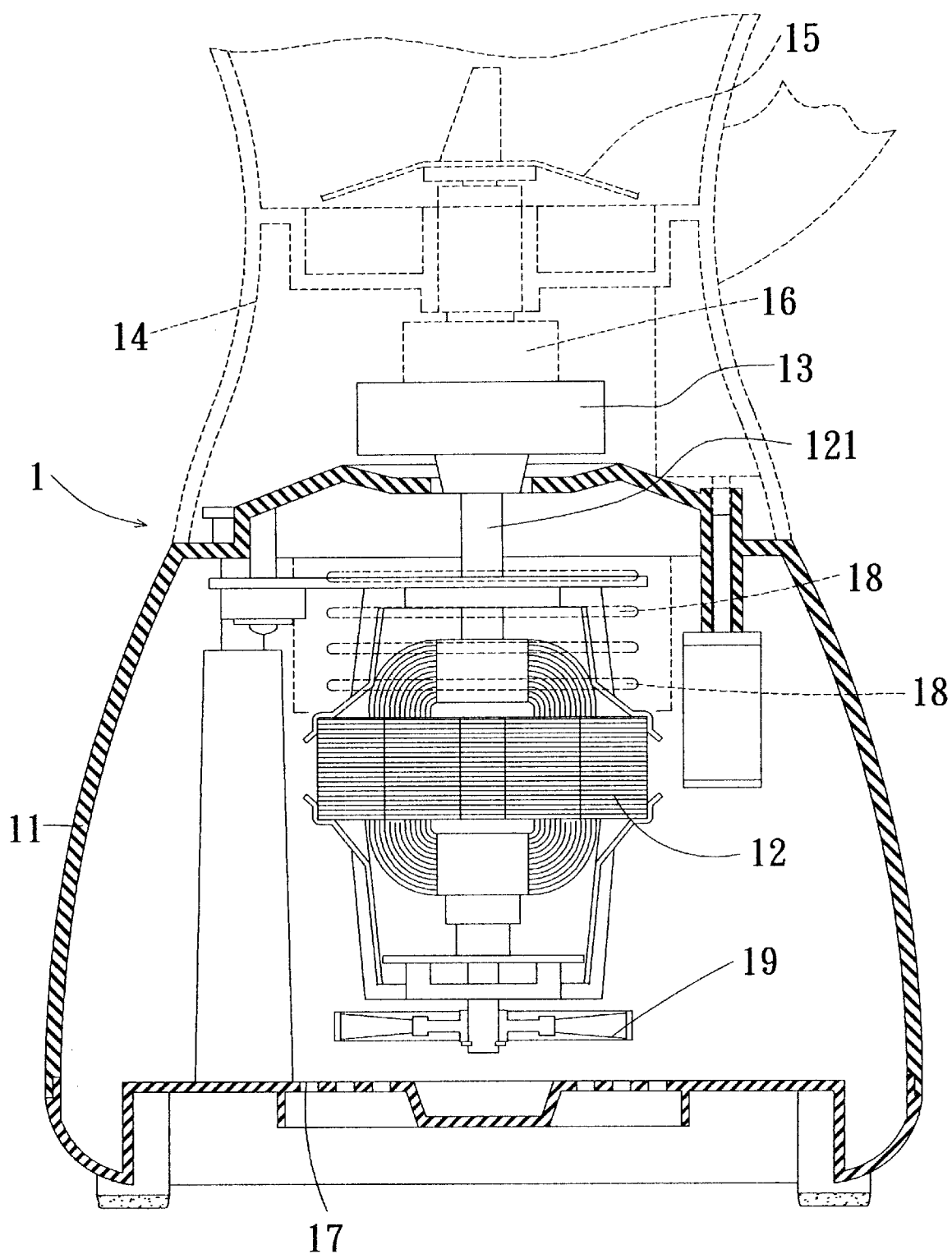
FIG. 1 is a cross-sectional view of the first conventional food processor as described in the Background.
Figure 2:
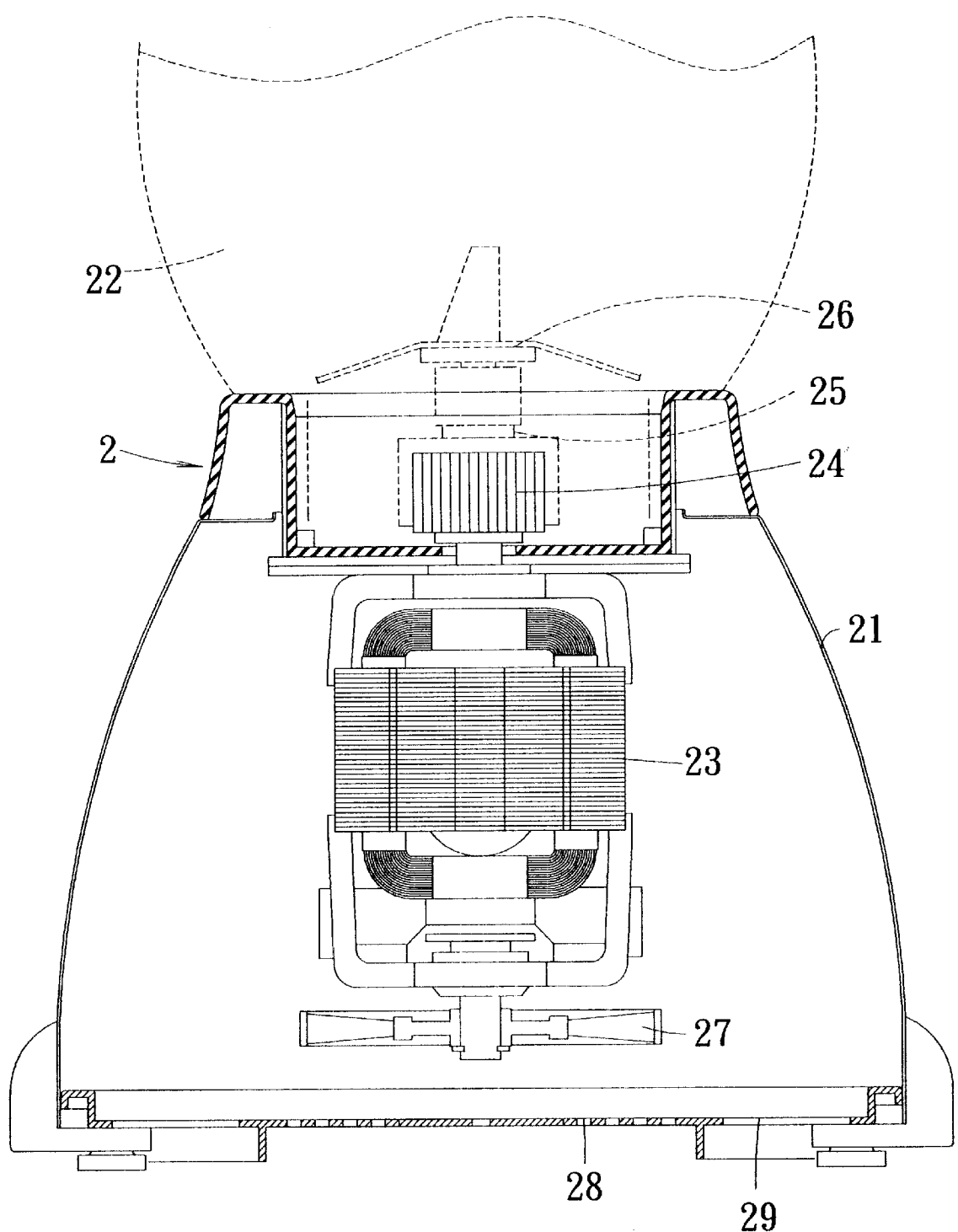
FIG. 2 is a cross-sectional view of the second conventional food processor as described in the Background.
Figure 3:
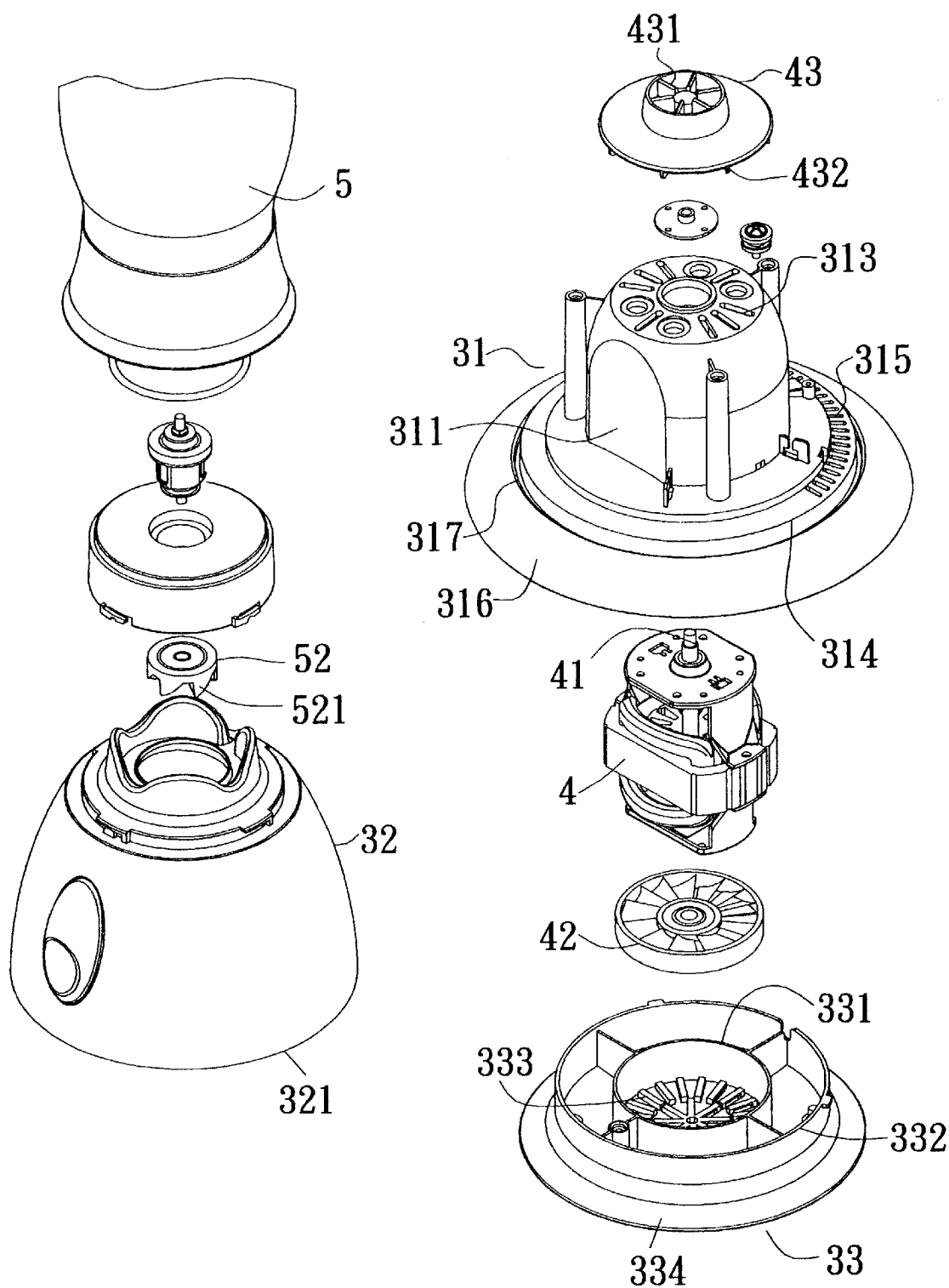
FIG. 3 is an exploded perspective view of the food processor according to the present invention.
Figure 4:
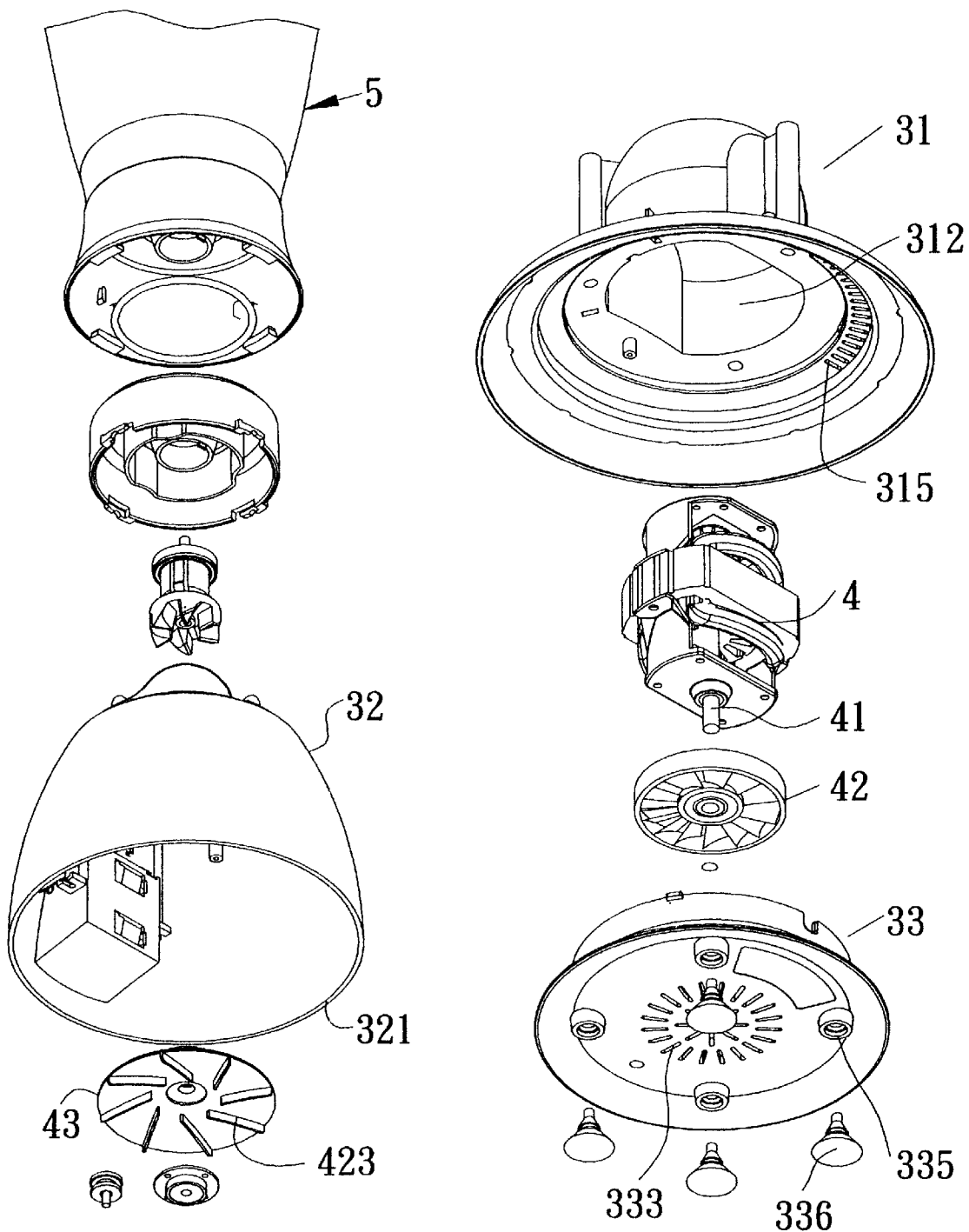
FIG. 4 is another exploded perspective view of the food processor according to the present invention; and, FIG. 5 is a cross-sectional view of the food processor of the present invention in working condition.

Referring to FIGS. 3, and 4, a food processor with a radiating structure according to the present invention includes a food container 5, a motor 4, and a lower part 3, which consists of an inner shell 31, an outer shell 32, and a base plate 3.

The inner shell 31 has a holding portion 311, and an annular stepped portion, which extends from the lower end of the holding portion 311, and which includes an inner annular upwards-facing portion and an outer annular upwards-facing portion 314 around the inner one. There are air outlets 315 radially arranged on the outer annular upwards-facing portion 314. Extended from the annular stepped portion is an annular edge portion 316. There is an annular trench 317 formed on the annular edge portion 316 near to the annular stepped portion.

Formed on an upper side of the holding portion 311 is a central through hole (not numbered), and several vent holes 313 radially positioned around the central through hole.

The motor 4 is fixedly disposed in the holding portion 311 of the inner shell 31 with an upper end of a transmission shaft 41 thereof sticking out from the central through hole of the inner shell 31.

The outer shell 32 has a through hole (not numbered) on an upper end, and has a lower end 321 defining a lower opening thereof. The outer shell 32 is joined to the inner shell 31 with the lower end 321 being closely inserted into the annular trench 317 of the inner shell 31, the upper hole of the outer shell 32 being aligned with the central through hole of the inner shell 31.

Disposed between the upper side of the outer shell 32 and that of the inner shell 31 and joined to the upper end of the shaft 41 is a revolving member 43. There are teeth 431, and blades 432 formed on an upper side, and a lower side of the revolving member 43 respectively.

A cutting blade 51 is disposed in the food container 5, and connected to a connecting element 52 arranged under the bottom of the food container 5. There are teeth 521 formed on a bottom of the connecting element 52 so that when the food container 5 is placed on top of the outer shell 32, the teeth 521 engage the teeth 431 of the revolving member 43 for allowing rotary movement of the shaft 41 to be passed on to the cutting blade 51.

The base plate 33 has a main body, inner and outer annular wall 331, 332 sticking up from the main body. There is an annular sloping edge portion 334 formed on the main body of the base plate 33. Radially arranged on the main body and surrounded by the inner annular wall 331 are air inlets 333. The outer annular wall 332 of the base plate 33 is joined to the inner shell 31 under the inner annular upwards-facing portion of the inner shell 31. Encircled by the inner annular wall 331 and joined to a lower end of the shaft 41 is a fan 42.

Figure 5:
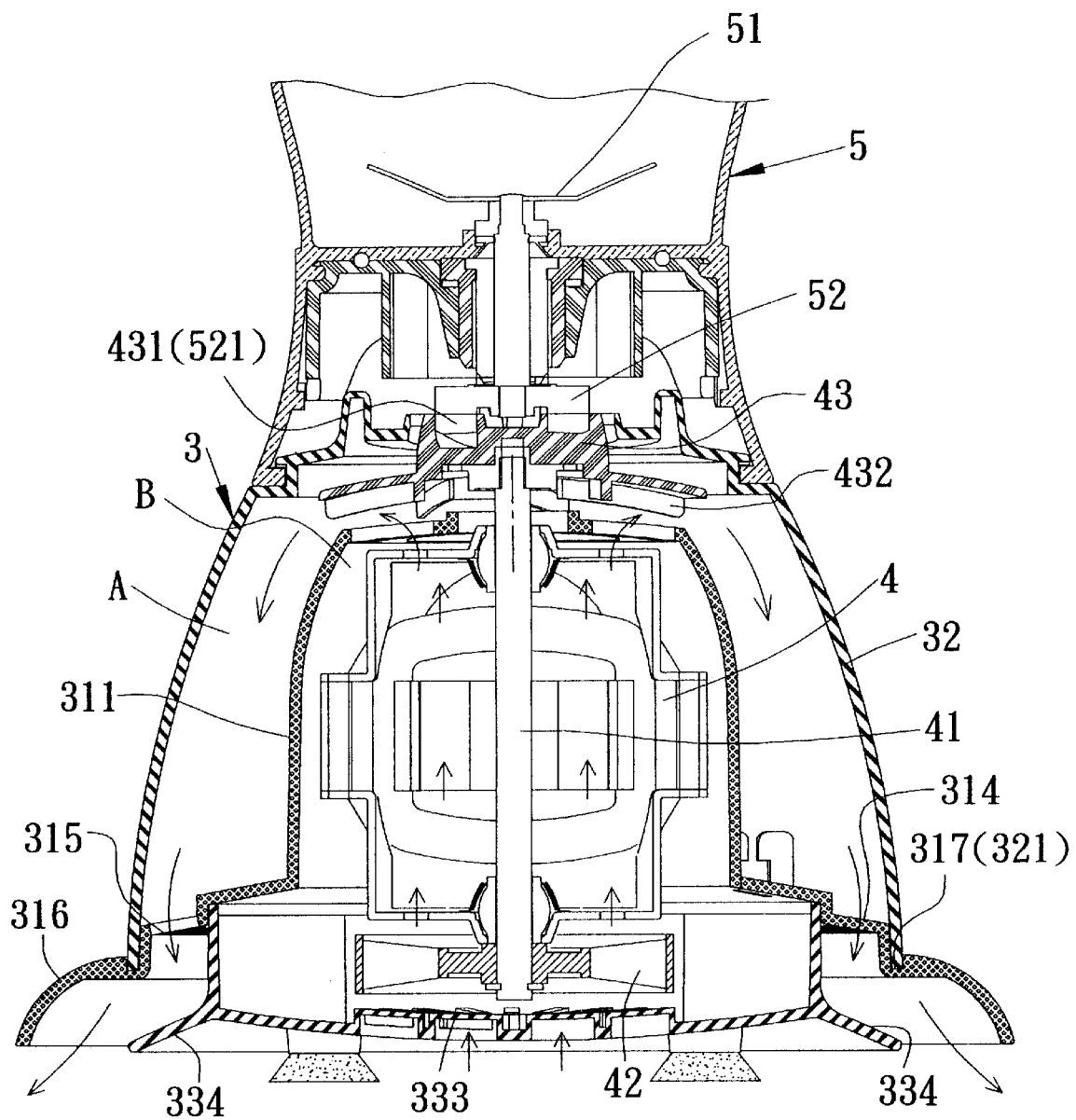

Thus, referring to FIG. 5, a first air passage (B) is formed, which consists of the air inlets 333, an inner space of the holding portion 311, and the vent holes 313 of the upper side of the inner shell 31. And, a second air passage (A) is formed, which consists of a space between the inner and the outer shells 31, 32, the air outlets 315 formed on the annular upwards-facing, portion 314 of the inner shell 31, and a space between the inner shell 31 and the base plate 33. In addition, the blades 432 of the revolving member 43 are shaped so as to be able to force air to travel into the second air passage (A).

When the motor 4 is actuated, both the fan 42 and the revolving member 43 equipped with the blades 432 will be turned by the shaft 41; thus, air is forced to travel through the first air passage (B) from the air inlets 333 to absorb heat produced by the motor 4, and is then forced to travel to outside through the second air passage (A). Consequently, heat produced by the motor 4 is dissipated.

From the above description, it can be understood that the food processor with the radiating structure according to the present invention has desirable features as followings:
1. Juices of food or water can't flow into the lower part 3 easily to cause damage to the motor 4, and the air outlets and the air inlets can't show to badly affect the appearance of the food processor because the air outlets and the air inlets are all formed on the bottom of the lower part 3.
2. Heat produced by the motor can be dissipated relatively effectively because the lower part 3 has the air inlets and the air outlets arranged in different locations, and because two shells, i.e. the inner and the outer ones, are provided for the air passage (B) to be separate from the air passage (A).
3. The annular sloping edge portion of the base plate can guide hot air moving out of the air passage (A) effectively to the atmosphere, thus preventing hot air from traveling back into the air passage (A) or into the first passage (B).
4. The blades provided on the bottom of the revolving member 43 can help increase heat dissipation rate of the food processor by means of forcing hot air to travel out of the first passage (B) and into the second passage (A).

What is claimed is:

1. A radiating structure for a motor of a food processor, comprising
   a plurality of air inlets formed on a base plate of a food processor;
   a first air passage provided in an inner shell, in which a motor of the food processor is disposed; the base plate being joined to a lower portion of the inner shell with the air inlets being in communication with the first air passage; an outer shell of the food processor being disposed around the inner shell with an upper hole thereof being aligned with a central hole of an upper side of the inner shell; an upper end of a shaft of the motor being passed through the central hole;
   a plurality of vent holes formed around the central hole of the upper side of the inner shell to be in communication with the first air passage;
   a second air passage formed between the inner shell and the outer shell to be in communication with outside;
   a fan connected to a lower end of the shaft of the motor and disposed over the air inlets of the base plate; and,
   a revolving member connected to the upper end of the shaft of the motor and disposed over the first air outlets of the inner shell;
   whereby air is forced to travel through the first air passage via the air inlets by the fan when the motor is working, and is then forced to travel to outside via the vent holes and the second air passage by the revolving member, helping dissipate heat produced by the motor.

2. The radiating structure for a motor of a food processor as claimed in claim 1, wherein the base plate has an outer annular wall sticking up from a main body thereof, and the inner shell has an annular stepped portion extending from a lower end thereof, and an annular edge extending from the annular stepped portion; the annular stepped portion including a first annular upwards-facing portion and a second annular upwards-facing portion around the first one; a lower end of the outer shell being joined to the annular edge of the inner shell; the outer annular wall of the base plate being joined to the inner shell under the first annular upwards-facing portion; the second annular upwards-facing portion having air outlets formed thereon for the second air passage to be in communication with outside.

3. The radiating structure for a motor of a food processor as claimed in claim 2, wherein the air outlets and the vent holes of the inner shell are radially positioned.

4. The radiating structure for a motor of a food processor as claimed in claim 2, wherein the base plate has an inner annular wall sticking up from the main body thereof, and the air inlets thereof are surrounded by the inner annular wall.

5. The radiating structure for a motor of a food processor as claimed in claim 4, wherein the air inlets are radially positioned on the base plate.

6. The radiating structure for a motor of a food processor as claimed in claim 2, wherein the annular edge of the inner shell is formed with an annular trench near to the annular stepped portion, and the outer shell is joined to the inner shell with the lower end thereof being closely inserted into the annular trench of the annular edge of the inner shell.

7. The radiating structure for a motor of a food processor as claimed in claim 2, wherein the main body of the base plate is formed with an annular sloping edge portion for guiding current of air traveling out of the air outlets of the inner shell.

8. The radiating structure for a motor of a food processor as claimed in claim 1, wherein the base plate has a plurality of connecting holes thereon, and soft plastic foot members are fitted to the connecting holes.

9. The radiating structure for a motor of a food processor as claimed in claim 2, wherein the revolving member has blades on a bottom thereof.

* * * * *